April 22, 1969     D. A. GUNTHER     3,440,157
ELECTROLYTIC PROCESS FOR PRODUCING PYROGEN FREE DEIONIZED WATER
Filed Nov. 4, 1964

INVENTOR.
DONALD A. GUNTHER

United States Patent Office 3,440,157
Patented Apr. 22, 1969

3,440,157
ELECTROLYTIC PROCESS FOR PRODUCING
PYROGEN FREE DEIONIZED WATER
Donald A. Gunther, Erie, Pa., assignor to American Sterilizer Company, Erie, Pa., a corporation of Pennsylvania
Filed Nov. 4, 1964, Ser. No. 408,823
Int. Cl. C02b 1/82; B01k 3/02
U.S. Cl. 204—152                         1 Claim

ABSTRACT OF THE DISCLOSURE

A process of treating deionized water that contains a high population of bacteria and the resultant possibility of pyrogenicity, which includes filtering the water to remove substantially all of the filterable bacteria and then passing the water between two electrodes, between which there is a substantially high potential sufficient to produce a current density of at least 0.1 milliampere per square millimeter of electrode surface. This high current density results in oxidization of some of the water and substantially all of the pyrogens are therefore destroyed. The voltage to produce such a current density may be in the range of say 7,500 volts if the electrodes are spaced apart accordingly.

---

Figures 1, 2:
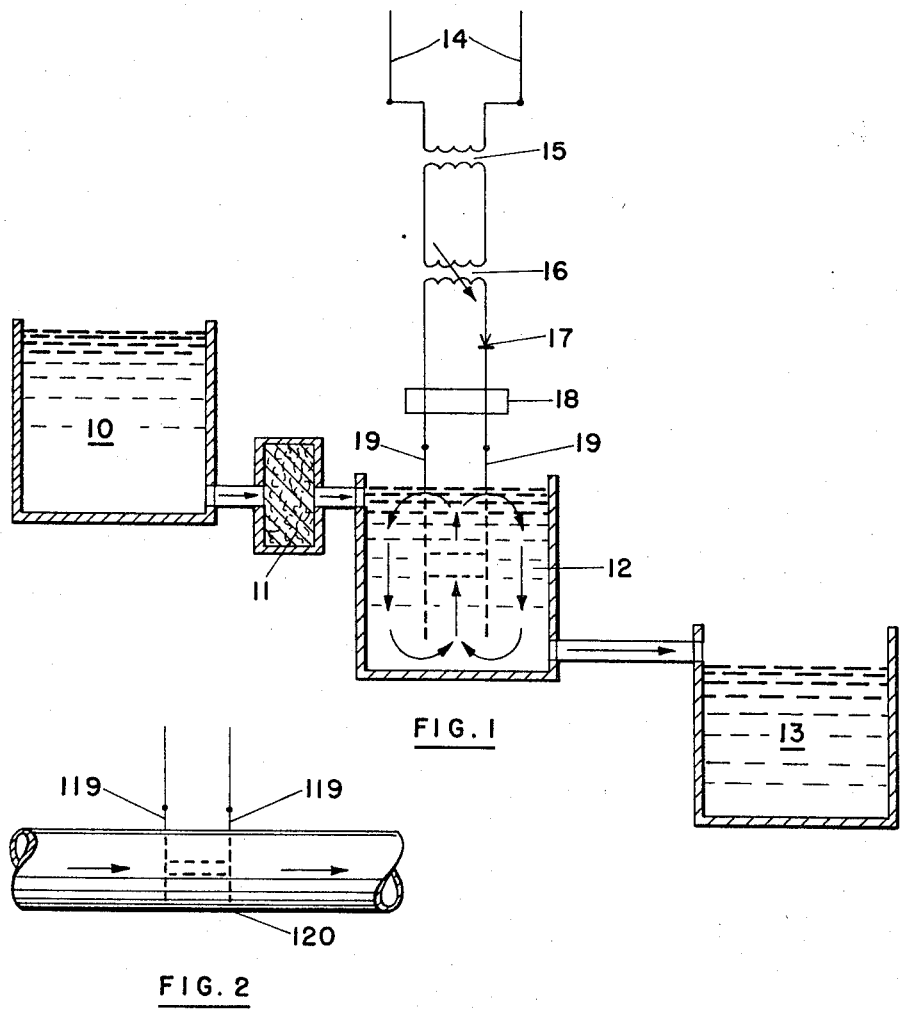

This invention relates to purification systems and more particularly to destruction of pyrogen by means of electrolysis.

Deionized water is not considered by many authorities to be acceptable for preparing physiological solutions because of the high populations of bacteria present and the resultant possibility of pyrogenicity. It has been discovered that deionized water can be made innocuous by filtering out most bacteria and destroying pyrogenicity by passing the water through suitably charged electrodes in a flow system or in a static system with the electrolytic cell mounted in a storage tank where continuous agitation through or around charged electrodes constantly purifies the water. Since pyrogens are known to be destroyed by oxidation, these pyrogens will be inactivated at the anode of an electrolytic cell where oxidation takes place. A suitable high potential of say 7,500 volts will be applied to the electrodes so as to initiate electrolysis of the water. A minimum current density of 0.1 milliampere per square millimeter has been discovered to be practical and necessary.

The function of the process is to destroy pyrogens in otherwise "pure" water so that this water may be used for preparing physiological solutions. The process will not introduce other impurities or otherwise affect the water so as to make it unsatisfactory for any use.

The process disclosed is intended primarily to treat deionized water since the presence of large populations of microorganisms in such water offers the possibility of pyrogen contamination. Such pyrogens must not be present in water used for physiological solutions since they may induce an unfavorable physiological reaction in a patient treated with such solutions. This reaction is manifested by fever.

Because of the possible pyrogen content of undistilled water, it is recommended by many users that all such physiological solutions be prepared from properly processed distilled water. Because of cost and convenience, however, the use of deionized water in clinical areas is becoming more widespread, and it is the intention of this invention to expand the area of use of deionized water by the treatment thereof as disclosed herein. It is an object of this invention to make the deionized water suitable for use in applications wherein deionized water is not now recommended.

It is known that pyrogens in water solutions are not completely destroyed or removed by normal sterilizing procedures or by any other technique normally employed. These pyrogens may be defined as chemical by-products of bacterial metabolism or cell degradation and, when injected into the human body, cause a febrile response in a patient even when present in minute quantities. Chemically, these pyrogens are generally accepted as consisting of, at least in part, a polysaccharide and a lipide fraction. Also, it is known that certain oxidizing agents destroy the ability of these pyrogens to induce this febrile response in a patent. Therefore, it is the intent of this invention to provide a process wherein oxidation occuring during electrolysis will likewise destroy pyrogenicity.

It is, accordingly, an object of the present invention to provide an improved process of destroying pyrogens in water and solution.

Another object of the invention is to provide an improved process for purifying deionized water.

A further object of the invention is to provide a process for treating water which is simple in construction and economical to carry out and to use.

With the above and other objects in view, the invention comprises the process set forth in the specification, drawing, and recited in the appended claims. The invention will be better understood from a reference to the drawing and detailed specification wherein:

FIG. 1 is a schematic diagram of a system for carrying out the process according to the invention; and FIG. 2 is an enlarged view of electrodes shown supported in a flow line.

Now with more particular reference to the drawing, the supply of deionized water is indicated at 10 connected in series flow relation with a filter 11 and a processing tank 12. The processing tank is connected through the conduit shown to a storage tank 13. Filter 11 may be of a type familiar to those skilled in the art which will be designed to remove most of the bacteria.

The electrodes 19 are disposed in spaced relation in the tank 12 and are connected to the secondary winding of the variable transformer 16 by means of a rectifier 17, which supplies the direct current for electrolysis.

The isolation transformer 15 connects the source of power 14 to the transformer 16. A suitable flow cell 18 may be connected across the secondary of the transformer 16 as shown at 18. The electrodes 19 may be made of platinum or the like. Instead of the tank 12, a suitable pipe 120 could be connected in series with the filter 11 and the storage tank 13 and instead of the electrodes 19, suitable electrodes 119 could be connected to the source of voltage.

The variable transformer 16 could be adjusted so that the voltage across the electrodes 19 or 119 would be sufficient to initiate electrolysis. This voltage should be sufficiently high so as to provide a minimum current density of 0.1 milliampere per square millimeter of electrode surface.

The foregoing specification sets forth the invention in its preferred practical forms but the process disclosed is capable of modification within a range of equivalents without departing from the invention which is to be understood is broadly novel as is commensurate with the appended claim.

The embodiments of the invention in which an exclusive property or privilege is claimed are defined as follows:

1. A process for producing pyrogen free deionized water comprising:

providing a source of water containing pyrogen, filtering said water to remove substantially all filterable bacteria, and passing said water into contact with and between two spaced electrodes having a substantial D.C. potential therebetween sufficient to produce a current density of at least 0.1 milliampere per square millimeter of electrode surface whereby oxidation takes place in said water and substantially all pyrogens are destroyed.

References Cited
UNITED STATES PATENTS

| | | | |
|---|---|---|---|
| 447,585 | 3/1891 | Schroeder | 204—152 |
| 844,262 | 2/1907 | Dieterich | 204—152 |
| 1,038,122 | 9/1912 | Hagg | 204—152 |

OTHER REFERENCES

Cox: "Laboratory Control of Water Purification," TD 430, C6, 1946, pp. 348 and 349.

JOHN H. MACK, *Primary Examiner.*

A. C. PRESCOTT, *Assistant Examiner.*

U.S. Cl. X.R.

204—149